G. M. GRAHAM.
SYSTEM OF AUTOMOBILE DECKING.
APPLICATION FILED MAY 1, 1920.
1,428,842.
Patented Sept. 12, 1922.
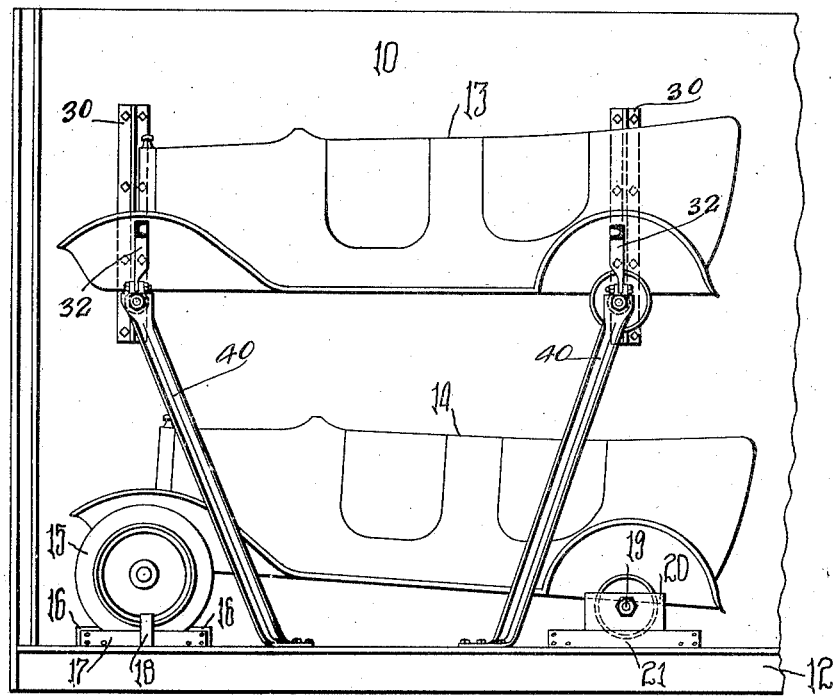
Fig. 1
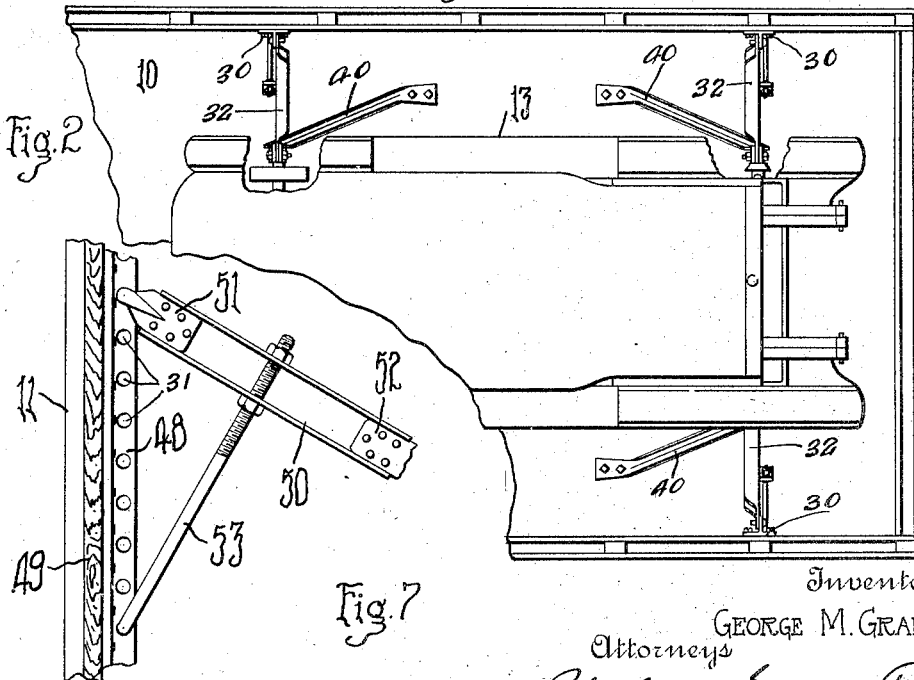
Fig. 2
Fig. 7
Inventor
GEORGE M. GRAHAM
Attorneys

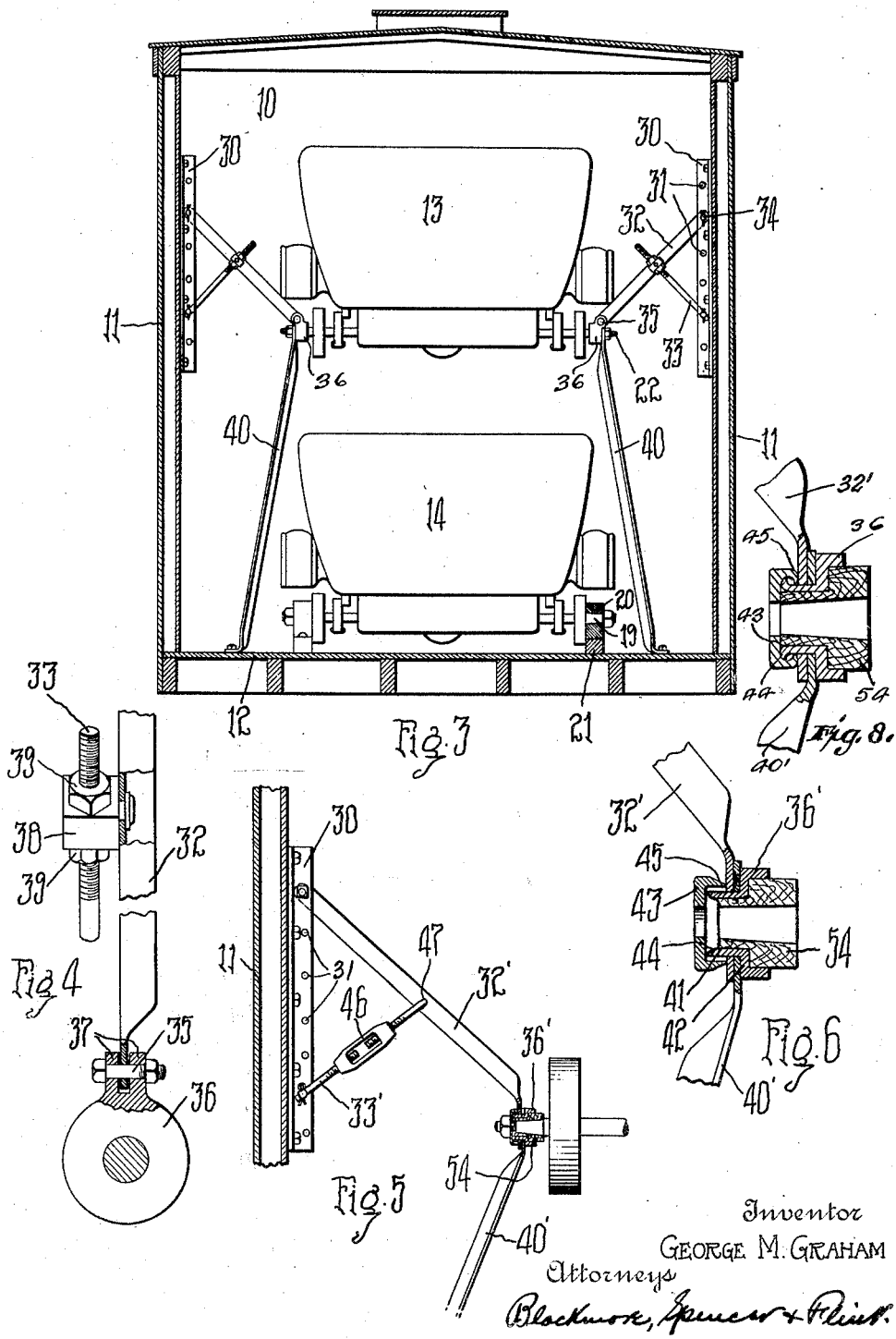

Patented Sept. 12, 1922.

1,428,842

UNITED STATES PATENT OFFICE.

GEORGE M. GRAHAM, OF NEW YORK, N. Y., ASSIGNOR TO GENERAL MOTORS CORPORATION, OF DETROIT, MICHIGAN, A CORPORATION OF DELAWARE.

SYSTEM OF AUTOMOBILE DECKING.

Application filed May 1, 1920. Serial No. 378,282.

*To all whom it may concern:*

Be it known that I, GEORGE M. GRAHAM, a citizen of the United States, and a resident of New York, county of New York, and State of New York have invented certain new and useful Improvements in a System of Automobile Decking, of which the following is a full, clear, concise, and exact description, such as will enable others skilled in the art to which the invention relates to make and use the same, reference being made therein to the accompanying drawings, which form a part of this specification.

The invention relates to the loading of automobiles upon railway cars or the like and more particularly to a method and means for facilitating the loading of a car with automobiles in the manner usually termed double-decking.

It is the primary object of my invention to provide new and improved means whereby one automobile may be supported in a car at such elevation that a second automobile may be run into the car beneath the first and secured on the floor of the car. A further object is to provide means whereby the first automobile may be suspended or supported in elevated position by devices engaging with the walls of the car only, thereby enabling the workmen to stow the second car without interference from the suspending means. A further object is the provision of means whereby the upper automobile may be secured against longitudinal movement relative to the car by bracing members adapted to be secured to the floor after the second automobile has been properly positioned.

Another object is the provision of improved means for securing the lower automobile to the car floor. Still another object is to provide metallic double-decking devices of permanent character, which may be easily and cheaply manufactured, readily installed or removed, and readily returned to the shipper at slight expense, thereby economizing in the time required for loading and also in the cost of the loading devices.

With the above and other objects in view as will appear more fully hereinafter, the invention comprises the novel features herein described and set forth in the appended claims.

In the accompanying drawings showing one embodiment of my invention:—

Fig. 1 is a side elevation of two automobiles arranged in superposed relation in a railway car.

Fig. 2, is a plan view, the upper automobile only being shown.

Fig. 3, is an end elevation of the structure shown in Fig. 1.

Fig. 4, is a fragmentary view of the device employed for suspending the upper automobile.

Fig. 5, is a similar view, but showing a slightly modified device,

Fig. 6, is an enlarged detail illustrating the construction of the device shown in Fig. 5, Fig. 7 is a detail view showing another modification and Fig. 8 is a detail view showing features of the construction illustrated in Fig. 6.

In the drawings 10 indicates a railway car which may be of the conventional type including side walls 11, 11, and floor 12. Two automobiles 13, 14, of any usual or desired character are shown in position in the car one above the other. It will be understood that the suspending devices may also be employed for supporting one automobile at such an elevation that other freight may be stowed thereunder, or that a single pair of such devices may be used to support one axle, the other axle being fixed to the floor, and the automobile taking an inclined position.

When the automobiles are loaded in double-decked relation the lower one is preferably supported as shown in Figs. 1 and 3 with each wheel 15 of one pair secured by blocks 16, nailed to the floor of the car and connected by a short board 17, each wheel being fastened to the floor also by strap 18. The wheels of the other pair are preferably removed and the axles 19 secured in blocks 20 which in turn are nailed or otherwise fastened to pieces 21 secured to the floor, the object being to raise the axles sufficiently to prevent the brake drums from resting upon the floor. It will be seen that by means of the devices described the lower automobile may be very rigidly secured to the floor of the car.

The means for supporting or suspending the upper automobile 13 includes metal bars, 30, which may be bars of T or L shape in cross-section and which may be secured to the walls 11 at the level at which the automobile is to be supported by lag screws or like means passing through holes in the flanges of the bars. I have found it sufficient in practice to make these bars approximately of the dimensions shown, although it will be understood that they may be extended in some cases if desired, and may even reach to the floor of the car. The transversely extending flange of the bar is provided with a series of perforations 31 adapted to receive pins formed upon or connected to the ends of suspension members 32 and brace members 33. As illustrated, the end of brace 33 is bent at an angle of 90° and the bent end is inserted into one of the perforations 31 in the flange of the bar 30.

The members 32 may be of any suitable construction providing sufficient strength, but are shown in Figs. 1 to 4 as formed of channel bars having flat end portions, one end being adapted to be secured to angle bar 30 by the pin 34 as above indicated, which pin may be separate from or permanently attached to the bar, as desired. The other end is adapted to be connected by pin 35, or secured by any other suitable means to the axle supporting member 36. The member 36 may be of any construction suitable to fit upon the axle of the automobile when the wheel has been removed. It is shown in Figs. 1 to 4 as a block adapted to fit around the axle and provided with lugs 37 having apertures to receive pin 35. Adjacent to the central portion of the suspension member 32 is secured thereto by any suitable pivotal connection a block 38 through which the screw-threaded end of strut member 33 extends and to which it is adjustably secured by the nuts 39.

It will be seen that the members 30, 32, and 33 provide truss structures arranged substantially in transverse vertical planes whereby the automobile may be suspended from the side walls of the car and prevented from relative movement transversely of the car. In order to prevent movement of the automobile longitudinally of the car I employ brace members 40 which may be formed of channel bars having their ends flattened and suitably apertured so that one end may fit over the vehicle axle 22 outside of block 36, and the other end may be nailed or otherwise fastened to the floor. These braces preferably extend diagonally in the direction of the length of the car in order to resist forces tending to displace the automobile lengthwise of the car. They are also shown as extending outwardly toward the sides of the car but this is merely to clear the automobile which may be placed on the floor, and may not be necessary in all cases. These braces are also shown in Figs. 1 and 2 as having their lower ends extending toward each other in the direction of the length of the car but this arrangement may be varied as desired.

In Figs. 5, 6 and 8 is shown a slight modification in which the axle block 36', corresponding to axle block 36 of the form first described, is made with a reduced end portion 41 providing a shoulder 42, and the suspension member 32' and brace 40' have apertured ends adapted to fit over the reduced portion 41 and against shoulder 42. The end 41 is also cut away on the interior, as at 44, to form a thin edge. A cap 43 similarly reduced to a thin edge by cutting away the exterior, as at 45, may be applied over the end 41, and by application of pressure the edges 44 and 45 may be turned respectively outward and inward as shown in Fig. 8 to lock the parts permanently together while allowing pivotal movement about the axis of the block. In this modification the strut member 33' comprises two sections connected by turnbuckle 46, one section having a hook engaging in a hole 31 as in the form first described, and the other section formed with a similar hook or pin and engaging in a hole 47 in a flange of the angle or channel bar 32'.

In Fig. 7 I have shown the wall-engaging member as comprising an angle bar 48 fastened by nails or screws to a wooden backing member 49 which in turn may be secured to the car wall 11 in any suitable manner. The suspending member is shown in this case as comprising the channel member 50 to which are riveted the end blocks 51, 52, which may be formed with suitable attaching devices as a pin or hook and an eye. The strut member 53 is shown as passing through holes in the flanges of the channel bar.

While I have illustrated the axle blocks as of one-piece construction, it will be understood that they may be made of two or more parts suitably secured together. They may of course be modified as necessary to adapt them to fit axles of different sizes or types, or wooden bushings or blocks 54 may be inserted within the axle blocks to make them fit smaller axles or protect the axles. They may also be adapted to fit over the hub caps if it should be considered undesirable to remove the automobile wheels. It will be obvious also that the elements which sustain tensile strains, as members 32 and 40, may be in some cases of flexible elements such as cables.

In loading automobiles in railway cars with my improved devices the wall members 30 are first secured in position, then one automobile is run into the car and hoisted by any suitable means to the desired elevation, the wheels being removed, and axle blocks 36 placed upon the axles. When at the proper elevation the pins 34 may be placed in the appropriate hole 31 and the struts 33 suitably adjusted. The automobile will now be supported or suspended entirely from the side walls, and the hoisting means may be removed, leaving the floor space of the car free for such further operations as may be necessary to stow a second automobile beneath the first. As a final step the brace members 40 or 40' may be applied, or swung down to proper position as the case may be, and firmly secured to the floor.

While I have described in detail specific devices embodying my invention it will be obvious that various changes may be made in the details of construction without departing from the spirit and scope of the invention as set forth in the following claims.

I claim:

1. In means for supporting an automobile in a railway car, the combination of means disposed substantially in transverse planes adapted to suspend the automobile from the walls of the car, and independent bracing means connecting the automobile to the floor of the car and adapted to prevent longitudinal movement of the automobile relative to the car.

2. Means for securing automobiles in railway cars comprising vertical bars secured to the walls of the car, members attached to said bars and extending downwardly and inwardly to the automobile axles whereby the automobile is suspended from said bars, and rigid brace members extending from the axles to the floor of the car.

3. Means for securing automobiles in railway cars comprising metallic structures arranged substantially in transverse planes and adapted to suspend the automobile from the walls of the car and prevent relative movement thereof laterally, and additional metallic bracing elements constructed and arranged to prevent relative movement of the automobile longitudinally of the car.

4. Means for securing an automobile in a railway car comprising a truss structure for each axle of the automobile arranged substantially in a vertical plane and adapted to suspend the automobile from the car walls, and independent means for bracing the automobile against relative movement longitudinally of the car.

5. Means for securing automobiles in railway cars comprising, for each axle, a vertical metal bar secured to the car wall, a metal bar pivotally connected to said vertical bar and extending therefrom downwardly and inwardly to the axle, means for preventing transverse movement of said last-mentioned bar, and a metal brace connected to the axle and extending downwardly therefrom to the floor.

6. Means for securing an automobile in elevated position in a railway car comprising a substantially vertical member secured to the wall of the car, and a tension element extending from said member to the automobile.

7. In means for securing an automobile in a railway car, a bar secured to the wall of the car, a tension element adjustably connected to said bar and extending to the automobile, and means for preventing movement of said tension element in a transverse plane.

8. In means for securing an automobile in a railway car, a metallic member secured to the wall of the car, a tension element extending from said member to the automobile, and a strut of adjustable length connected to said member and said element.

9. Means for securing an automobile in a railway car comprising an axle support, a bar secured to said axle support and adapted to suspend the support from the side wall of the car and a bar secured to said axle support and adapted to be attached to the car floor.

10. Means for suspending an automobile in a railway car comprising a substantially vertical angle bar secured to the wall of the car, an axle support, a tension bar connecting said axle support to said vertical bar, a strut adjustably connecting said tension bar to said angle bar, and bracing means connecting said axle support to the floor of the car.

11. In means for securing automobiles in railway cars, the combination of a member adapted to engage around the axle of an automobile when the wheel is removed, and two elements pivotally attached to said member, one adapted to support the member from the wall of the car and the other adapted to be secured to the floor of the car.

12. The method of double-decking motor vehicles in railway cars comprising suspending one vehicle from the walls of the car, securing a second vehicle to the floor beneath the first, and then connecting the first vehicle to the floor of the car by bracing means.

13. The method of double-decking motor vehicles in railway cars comprising suspending one vehicle at a suitable elevation, placing a second vehicle beneath the first, securing one set of wheels of said second vehicle to the floor of the car, removing the other pair of wheels from their axle, and securing said axle to the floor of the car.

14. Means for double-decking automobiles in railway cars comprising means for suspending one automobile from the walls of the car, means for securing one pair of wheels on a second automobile on the floor of the car, means for supporting the axle of the second pair of wheels from the floor of the car, the second pair of wheels being removed, and bracing means for the first automobile arranged on both sides of the second automobile and connected to the floor of the car.

15. In a decking device for automobiles, supporting members associated with each axle extremity, said members comprising a single bar only extending downwardly from each axle extremity, two of said bars being arranged in downwardly converging relation.

In testimony whereof I affix my signature.

GEO. M. GRAHAM.